Oct. 30, 1962 J. C. BLINSTON 3,061,817
FINDER CIRCUIT
Filed April 22, 1959
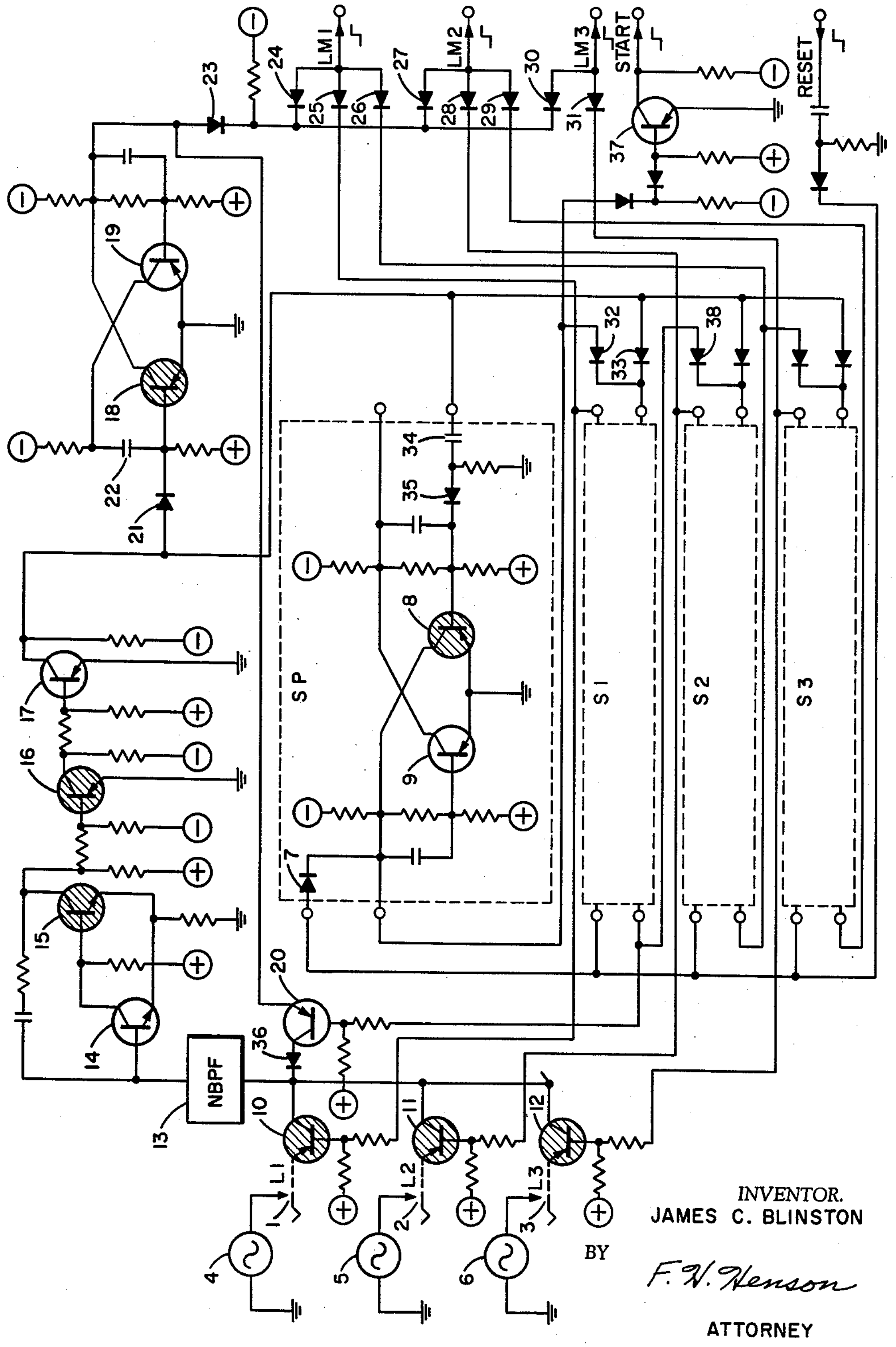
INVENTOR.
JAMES C. BLINSTON
BY F. W. Henson
ATTORNEY United States Patent Office 3,061,817
Patented Oct. 30, 1962

3,061,817
FINDER CIRCUIT

James C. Blinston, Victor, N.Y., assignor to General Dynamics Corporation, Rochester, N.Y., a corporation of Delaware Filed Apr. 22, 1959, Ser. No. 808,147
10 Claims. (Cl. 340—168)

This invention relates in general to electrical signaling systems and, more particularly, to finder circuits for registering the identity of a conductor or line over which a signal is received.

Although the finder circuit herein disclosed has many applications, it is particularly adapted for use as a line-finder in a telephone system of the type disclosed in co-pending application, Serial Number 721,241, filed March 13, 1958 now Pat. No. 2,947,819 and assigned to the same assignee as the present invention. In the system disclosed in the above-identified application, an alternating current seize signal is transmitted over a line when a call is initiated on that line and the identity of the line is registered by a call finder or seize signal scan circuit at the central office. The seize signal scan circuit disclosed in the above-identified application is of the conventional type wherein a pulse operated counting chain is continuously stepped by a multi-vibrator to control the connection of each line of a group of lines in turn to a seize signal detector circuit common to said group of lines for the purpose of detecting the presence of a seize signal on any one of said lines.

It is the general object of this invention to provide a new and improved finder circuit.

It is a more particular object of this invention to provide a new and improved finder circuit which comprises fewer components and is thus less expensive to produce than finder circuits of the prior art and which is operated on a demand basis.

The present invention accomplishes the above-cited objects by providing a finder circuit in which all of the lines or input conductors served by the finder circuit are normally connected to the input circuit of a signal detector, the signal detector generates pulses as long as a signal is coupled to its input circuit, and a pulse operated counting chain is stepped by the detector generated pulses to disconnect each of said lines or conductors one after another from the input circuit of said detector. Thus, when the line or conductor having a signal applied thereto is disconnected from the input circuit of the signal detector, pulses are no longer generated by the detector, and the counting chain remains in the setting corresponding to that line or conductor.

Further objects and advantages of the invention will become apparent as the following description proceeds, and features of novelty which characterize the invention will be pointed out in the claims annexed to and forming a part of this specification.

For a better understanding of the invention, reference may be had to the accompanying drawing which shows circuit details of a finder circuit.

The finder circuit has been illustrated as embodied in a simple system in which an alternating current signal can be selectively applied to any one of the input conductors L1, L2, and L3 by the operation of mechanical keys 1, 2, and 3, respectively. When the finder circuit is used in a telephone system of the type disclosed in the above-identified application, each of the generators 4, 5, and 6 is an oscillator at a subscriber station which generates a 1700 c.p.s. seize signal when the phone is taken off-hook and keys 1, 2, and 3 represent hookswitch contacts at each of three stations. While only three lines or input conductors are shown, it is to be understood that the illustrated finder circuit can accommodate any number of lines or input conductors.

At the termination of each finding operation of the illustrated circuit, the finder circuit is reset by the application of ground potential to conductor Reset. Ground potential may be applied to conductor Reset by the operation of a manual key or, if the finder circuit is used in a system of the type disclosed in the above-identified application, may be applied by a succeeding circuit when the identification of the found line has been transmitted over one of the marking conductors LM1–LM3 and read in by that circuit. When the potential of conductor Reset goes from negative to ground, each of the flip-flop stages SP, S1–S3 is reset, if set, through a diode corresponding to diode 7 to the condition in which the transistor corresponding to transistor 8 is conductive and the transistor corresponding to transistor 9 is non-conductive. When the flip-flop stages S1–S3 are in the condition in which transistor 9 in each of those stages is non-conductive, negative potential is applied to the base electrode of each of the bilateral transistor switches 10, 11, and 12, respectively, and said switches are biased for conduction. In the absence of signals on any of the conductors L1–L3, the signal detector, which comprises narrow band-pass filter 13, emitter coupled trigger circuit transistors 14 and 15, and inverter amplifier transistors 16 and 17, is in the condition in which transistors 15 and 16 are conductive and transistors 14 and 17 are non-conductive, as illustrated. Since transistor 17 is non-conductive, the monostable oscillator or delay multivibrator comprising transistors 18 and 19 is in the condition in which transistor 18 is conductive to apply ground potential to the emitter electrode of clamping transistor 20. Transistor 20 is non-conductive at this time, however, since its base electrode is held slightly positive with respect to its emitter electrode because of the fact that transistor 8 in flip-flop stage S1 is conductive.

To illustrate the finding operation of the finder circuit, assume that key 2 is operated to apply the signal generated by generator 5 to conductor L2. The alternating current signal appearing on conductor L2 is coupled through conducting transistor 11 and band-pass filter 13 to the base electrode of transistor 14. As previously mentioned, transistors 14 and 15 form an emitter coupled trigger circuit in which transistor 15 is normally conductive and transistor 14 is non-conductive. Transistor 14 is rendered conductive to trigger the circuit to its "On" condition only when its base electrode becomes positive with respect to its emitter which is held at a positive potential by the conduction of transistor 15. When transistor 14 becomes conductive, transistor 15 is rendered non-conductive and the emitter potentials of transistors 14 and 15 become more negative to thereby lock the circuit in its "On" condition. Conversely, transistor 14 is rendered non-conductive whenever its base electrode becomes more negative than its emitter electrode. Thus, it can be seen that the emitter coupled trigger circuit is triggered to its "On" condition during each positive half-cycle and to its "Off" condition during each negative half-cycle of the A.-C. signal coupled through filter 13 and serves to generate a square waveform signal. Each time that the trigger circuit is triggered to its "On" condition and transistor 15 becomes non-conductive, transistor 16 is rendered non-conductive and transistor 17 is rendered conductive. Thus, positive-going pulses corresponding to the positive half-cycles of the detected signal appear at the collector of transistor 17.

The first positive-going pulse appearing at the collector of transistor 17 is coupled through diode 21 to trigger the monostable oscillator comprising transistors 18 and 19 to the condition in which transistor 18 is non-conductive and transistor 19 is conductive and is also utilized to trigger the prime flip-flop stage SP to the condition in which transistor 8 is non-conductive and transistor 9 is conductive. The monostable oscillator is so designed that if the circuit is triggered by a single pulse, transistor 18 remains non-conductive for at least twice the time interval between pulses appearing at the collector of transistor 17. As used in the illustrated circuit, timing capacitor 22 is recharged by each pulse appearing at the collector of transistor 17 and coupled through diode 21 so that transistor 18 remains non-conductive as long as pulses appear at the collector of transistor 17. When transistor 18 becomes non-conductive, the emitter of clamping transistor 20 is returned to negative potential so as to prevent that transistor from becoming conductive during the finding operation and ground potential through diode 23 is removed from the output gates, comprising diodes 24–31, inclusive, for a purpose which will be described more fully hereinafter. When transistor 8 in flip-flop stage SP becomes non-conductive, the anode terminal of diode 32 goes negative but without effect since a positive pulse is still present at the collector of transistor 17. Also when transistor 8 in flip-flop stage SP becomes non-conductive, amplifier transistor 37 becomes conductive to apply ground potential to conductor Start. The ground potential on conductor Start may be used to prepare a succeeding circuit for operation.

At the end of the first pulse, the collector of transistor 17 and the anode terminal of diode 32 go negative and the capacitor corresponding to capacitor 34 in flip-flop stage S1 charges to a negative potential so that the next occurring positive-going pulse at the collector of transistor 17 is coupled through the diode corresponding to diode 35 in stage S1 and stage S1 is triggered to the condition in which transistor 8 is non-conductive and transistor 9 is conductive. It is to be noted that when transistor 8 in stage S1 becomes non-conductive, the base of clamping transistor 20 is returned to a negative potential but transistor 20 remains non-conductive since its emitter is returned to a more negative potential at the collector of non-conducting transistor 18. Also, when transistor 8 in stage S1 becomes non-conductive, the anode of diode 38 is returned to a negative potential to prepare stage S2 for triggering in the same manner as described for stage S1. When transistor 9 in stage S1 becomes conductive, the base of bilateral switch 10 goes positive and conductor L1 is effectively disconnected from the input circuit of the signal detector.

Since it was assumed that a signal was applied to conductor L2, another positive-going pulse appears at the collector of transistor 17 and flip-flop stage S2 is triggered to the condition in which the transistor corresponding to transistor 8 is non-conductive and the transistor corresponding to transistor 9 is conductive. When transistor 9 in stage S2 becomes conductive, bilateral switch transistor 11 is biased for non-conduction and conductor L2 is effectively disconnected from the input circuit of the signal detector. Since no further positive-going pulses appear at the collector of transistor 17, the monostable oscillator reverts to the condition in which transistor 18 is conductive, ground potential is applied through diode 23 to the cathode terminals of diodes 24, 27, and 30, and ground potential is applied to the emitter electrode of clamping transistor 20. Transistor 20 now becomes conductive to couple ground potential through diode 36 to the input circuit of the signal detector so as to prevent any subsequently initiated calls from having any effect on the finder circuit. With the counting chain in the just described condition, all inputs to the AND gate for positive signals comprising diodes 27, 28, and 29 are at ground potential and ground potential is, therefore, applied to conductor LM2 to identify the found line or input conductor to a succeeding circuit. It can be seen that the cathode terminals of diodes 27, 28, and 29 are returned to ground potential at the collector of transistor 18, at the collector of transistor 9 in stage S2, and to the collector of transistor 8 in stage S3, respectively. Negative potential is applied to conductor LM1 from the collector of transistor 8 in stage S2 through diode 26, while negative potential is applied to conductor LM3 from the collector transistor 9 in stage S3 through diode 31.

To review briefly, a signal applied to conductor L2 causes the counting chain to advance to a point where flip-flop stage S2 is set and switch 11 is controlled to disconnect conductor L2 from the input circuit of the signal detector. The monostable oscillator circuit then resets to clamp the input circuit of the signal detector to ground potential and to enable the output gates so that a ground potential marking can be applied to the marking conductor corresponding to the input conductor having a signal applied thereto. The finder circuit remains in the just described condition until ground potential is applied to conductor Reset and then reverts to its initially described condition.

It should be obvious that if signals are simultaneously applied to two or more of the input conductors L1–L3, the counting chain will continue to step until the highest number input conductor having a signal applied thereto is disconnected from the input circuit of the signal detector.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A finder circuit comprising a signal detector having an input circuit and an output circuit, a plurality of input conductors, means for normally connecting all of said conductors to the input circuit of said detector, means for selectively applying a signal to any one of said conductors, means controlled by the output circuit of said detector for disconnecting said conductors one after another from the input circuit of said detector as long as a signal is detected by said detector, and means in said finder circuit for registering the identity of the last conductor disconnected from the input circuit of said detector.

2. A finder circuit comprising a signal detector having an input circuit and an output circuit, a plurality of input conductors, means for normally connecting all of said conductors to the input circuit of said detector, means for selectively applying a signal to one or more of said conductors, stepping means controlled by the output circuit of said detector for disconnecting said conductors one after another and in a predetermined order from the input circuit of said detector as long as a signal is detected by said detector whereby said stepping means advances to the point where the highest order conductor having a signal applied thereto is disconnected from said detector, and means including said stepping means for registering the identity of the last conductor disconnected from the input circuit of said detector.

3. In combination, a plurality of conductors, a finder circuit comprising a signal detector having an input circuit, stepping means, and a plurality of switches for individually connecting said conductors to the input circuit of said detector, means in said stepping means for normally controlling each of said switches to connect its associated conductor to the input circuit of said detector and operable to control said switches one after another to disconnect their respective conductors from the input circuit of said detector, means for selectively applying a signal to any one of said conductors, means for operating said stepping means as long as a signal is detected by said detector, and means including said stepping means for registering the identity of the last conductor disconnected from the input circuit of said detector.

4. In combination, a plurality of conductors, a finder circuit comprising a signal detector having an input circuit, stepping means, and a plurality of switches for individually connecting said conductors to the input circuit of said detector, means in said stepping means for normally controlling each of said switches to connect its associated conductor to the input circuit of said detector and operable to control said switches one after another and in a predetermined order to disconnect their respective conductors from said detector, means for applying a signal to one or more of said conductors, means for operating said stepping means as long as a signal is detected by said detector whereby said stepping means advances to the point where the highest order switch corresponding to a conductor having a signal applied thereto is controlled to disconnect that conductor from said detector, and means including said stepping means for registering the identity of the last conductor disconnected from the input circuit of said detector.

5. In combination, a plurality of conductors, a finder circuit comprising a plurality of switches, a signal detector having an input circuit, and stepping means, each of said switches having an input terminal and an output terminal, means for individually connecting said conductors to said input terminals, means for connecting said output terminals to the input circuit of said detector, means in said stepping means for normally controlling each of said switches to present a low impedance between its input and output terminals so that all of said conductors are normally connected to the input circuit of said detector and operable to control each of said switches one after another to present a high impedance between its input and output terminals to thereby effectively disconnect the conductor connected to its input terminal from the input circuit of said detector, means for selectively applying a signal to any one of said conductors, means for operating said stepping means as long as a signal is detected by said detector, and means including said stepping means for registering the identity of the last conductor disconnected from the input circuit of said detector.

6. In combination, a plurality of conductors, a finder circuit comprising a plurality of switches, a signal detector having an input circuit, and stepping means, each of said switches having an input terminal and an output terminal, means for individually connecting said conductors to said input terminals, means for connecting said output terminals to the input circuit of said detector, means in said stepping means for normally controlling each of said switches to present a low impedance between its input and output terminals so that all of said conductors are normally connected to the input circuit of said detector and operable to control each of said switches one after another and in a predetermined order to present a high impedance between its input and output terminals to thereby effectively disconnect the conductor connected to its input terminal from the input circuit of said detector, means for applying a signal to one or more of said conductors, means for operating said stepping means as long as a signal is detected by said detector whereby said stepping means advances to the point where the highest order switch corresponding to a conductor having a signal applied thereto is controlled to disconnect that conductor from the input circuit of said detector, and means including said stepping means for registering the identity of the last conductor disconnected from the input circuit of said detector.

7. In combination, a plurality of conductors, a signal detector having an input circuit, a plurality of switches for individually connecting said conductors to the input circuit of said detector, a pulse operated counting chain for normally controlling each of said switches to connect its associated conductor to the input circuit of said detector and operable responsive to the application of pulses thereto to control said switches one after another to disconnect their respective conductors from the input circuit of said detector, means for selectively applying a signal to any one of said conductors, means in said detector for generating pulses as long as a signal is coupled to the input circuit of said detector, and means for coupling the pulses generated by said detector to said counting chain whereby said counting chain advances to the setting in which the switch corresponding to said one conductor is controlled to disconnect said one conductor from the input circuit of said detector.

8. In combination, a plurality of conductors, a signal detector having an input circuit, a plurality of switches for individually connecting said conductors to the input circuit of said detector, a pulse operated counting chain for normally controlling each of said switches to connect its associated conductor to the input circuit of said detector and operable responsive to the application of pulses thereto to control said switches one after another and in a predetermined order to disconnect their respective conductors from the input circuit of said detector, means for applying a signal to one or more of said conductors, means in said detector for generating pulses as long as a signal is coupled to its input circuit, and means for coupling the pulses generated by said detector to said counting chain whereby said counting chain is advanced to the setting in which the highest order switch corresponding to a conductor having a signal applied thereto is controlled to disconnect that conductor from the input circuit of said detector.

9. In combination, a plurality of conductors, a signal detector having an input circuit, a plurality of switches each having an input terminal and an output terminal, means for individually connecting said conductors to said input terminals, means for connecting said output terminals to the input circuit of said signal detector, a pulse operated counting chain for normally controlling each of said switches to present a low impedance between its input and output terminals so that all of said conductors are normally connected to said signal detector and operable responsive to the application of pulses thereto to control each of said switches one after another to present a high impedance between its input and output terminals to thereby effectively disconnect the conductor connected to its input terminal from the input circuit of said detector, means for selectively applying a signal to any one of said conductors, means in said detector for generating pulses as long as a signal is coupled to its input circuit, and means for coupling the pulses generated by said detector to said counting chain whereby said counting chain advances to the setting in which the switch corresponding to said one conductor is controlled to disconnect said one conductor from the input circuit of said detector.

10. In combination, a plurality of conductors, a signal detector having an input circuit, a plurality of switches each having an input terminal and an output terminal, means for individually connecting said conductors to said input terminals, means for connecting said output terminals to the input circuit of said signal detector, a pulse operated counting chain for normally controlling each of said switches to present a low impedance between its input and output terminals so that all of said lines are normally connected to said signal detector and operable responsive to the application of pulses thereto to control each of said switches one after another and in a predetermined order to present a high impedance between its input and output terminals to thereby effectively disconnect the conductor connected to its input terminal from the input circuit of said detector, means for selectively applying a signal to one or more of said conductors, means in said detector for generating pulses as long as a signal is coupled to its input circuit, and means for coupling the pulses generated by said detector to said counting chain whereby said counting chain is advanced to the setting in which the highest order switch corresponding to a conductor having a signal applied thereto is controlled to disconnect that conductor from the input circuit of said detector.

References Cited in the file of this patent

UNITED STATES PATENTS

| | | |
|---|---|---|
| 2,706,222 | Bjornson | Apr. 12, 1935 |
| 2,724,745 | Brewer | Nov. 22, 1955 |
| 2,892,037 | Feiner | June 23, 1959 |
| 2,919,309 | Bataille | Dec. 29, 1959 |